United States Patent [19]

Egami et al.

[11] Patent Number: 4,868,689
[45] Date of Patent: Sep. 19, 1989

[54] CIRCUIT FOR PRODUCING CLOCK SIGNAL FOR REPRODUCING PCM SIGNAL

[75] Inventors: Tsuyoshi Egami, Higashiosaka; Mitsufumi Yoshimoto, Nishinomiya, both of Japan

[73] Assignee: Sanyo Electric Co., Ltd., Osaka, Japan

[21] Appl. No.: 126,974

[22] Filed: Nov. 30, 1987

[30] Foreign Application Priority Data

Apr. 17, 1987 [JP] Japan .................................. 62-95584

[51] Int. Cl.$^4$ ........................... G11B 5/00; G11B 5/09
[52] U.S. Cl. ......................................... 360/32; 360/51
[58] Field of Search .............................. 360/32, 51, 73; 331/1 A, 18

[56] References Cited

U.S. PATENT DOCUMENTS 4,577,241 3/1986 Wilkinson ............................. 360/51
4,644,419 2/1987 Iinuma et al. ........................ 360/51

Primary Examiner—Vincent P. Canney
Attorney, Agent, or Firm—Armstrong, Nikaido, Marmelstein, Kukbovcik & Murray

[57] ABSTRACT

A circuit for use in reproducing a PCM signal recorded on a recording medium in a normal mode and a special mode, to control the frequency of a reproduction clock in accordance with variations in the frequency of the PCM signal. The speed of the medium and the speed of the head, or the frequency of a single-frequency signal in a track format recorded on the signal recording track of the medium is detected to produce a band control signal in accordance with the PCM signal frequency to shift the operating band of a voltage-controlled oscillator in the circuit.

5 Claims, 8 Drawing Sheets

CIRCUIT FOR PRODUCING CLOCK SIGNAL FOR REPRODUCING PCM SIGNAL

BACKGROUND OF THE INVENTION

1. Field of the Invention

The present invention relates to a circuit for producing a clock signal for reproducing a PCM signal for use in record reproduction systems, such as VTRs or digital audio tape recorders of the rotary head type (R-DAT).

2. Prior Art

The PCM signal is reproduced using a clock signal (fch=9.408 MHz) having twice the frequency of minimum bit pulses thereof (hereinafter referred to as "PCM" signal frequency).

A PCM signal is recorded, for example, on a magnetic tape, which is thereafter helically scanned by a magnetic head mounted on a cylinder rotating at a high speed for reproducing the signal in various modes, for example, high-speed search, usual mode or trick reproduction, or for monitoring during fast forwarding or rewinding. FIG. 12 shows a PLL (phase locked loop) circuit which is used for reading the reproduced PCM signal.

When the speed of the magnetic head 1, relative to the magnetic tape 2, is different from that in the usual reproduction mode, the PCM signal from the head has a different frequency. Accordingly, the circuit is adapted to automatically vary the reproduction clock frequency fch (i.e. channel clock frequency) in accordance with the difference.

The PLL circuit has a phase comparator 3, low-pass filter 4, limiter circuit 5 and voltage-controlled oscillator (VCO) 6. The reproduced PCM signal from the head 1 and the reproduction clock signal from the VCO are negatively fed back to the phase comparator 3.

3. Problem to be Solved

For the conventional PLL circuit, the operating range of the VCO 6 is restricted to the neighborhood of the desired frequency by the limiter circuit 5 as represented by the hatched area of FIG. 13 so that the reproduction clock will not be locked at an improper frequency.

However, if the reproduced PCM signal frequency varies beyond a limit, there arises a need for the reproduction clock signal of a frequency outside the operating range of the VCO. The conventional circuit therefore has a problem of being unable to reproduce the PCM signal data in this case.

Unexamined Japanese Patent Publication No. SHO 62-8354 and "Radio Technology," April 1987, pp. 74–77 disclose a method for use in a special reproduction mode wherein the speed of rotation of the head cylinder is altered to use the reproduction clock of usual frequency. Nevertheless, this method involves the problem that the rotational speed of the cylinder motor must be so controlled as to maintain the head cylinder at a definite speed relative to the magnetic tape.

SUMMARY OF THE INVENTION

An object of the present invention is to automatically shift the frequency band of the reproduction clock signal to be produced by a VCO by a suitable amount when the detection head reproduces a PCM signal in usual and special modes and to obtain a suitable reproduction clock signal in accordance with variations in the PCM signal frequency.

Another object of the invention is to provide a VCO control signal which is calculated by a detection circuit after detecting the tape speed Vt and the head speed Vh.

Another object of the invention is to provide a VCO control signal which is prepared from a single-frequency signal recorded in front of or behind the PCM signal record area on the signal record track of the recording medium, by converting the variation in the frequency of the signal to a voltage signal by a frequency/voltage converter.

Still another object of the invention is to provide a circuit which is operable free of errors even when the characteristics of the frequency/voltage converter are not matched with the voltage-frequency characteristics of the VCO.

DESCRIPTION OF THE PREFERRED EMBODIMENTS

Figure 1:
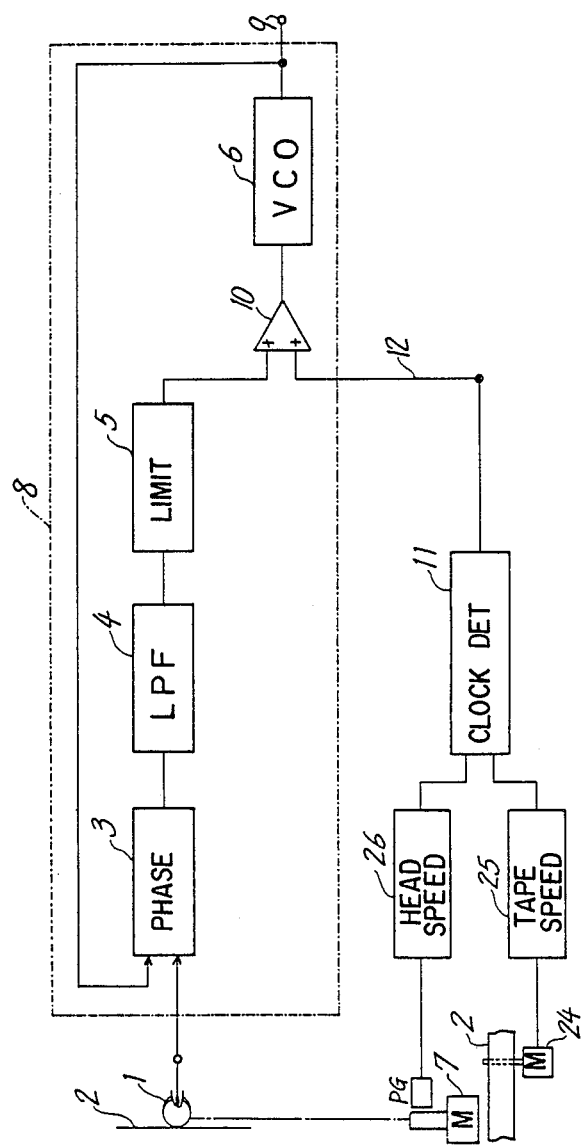
FIG. 1 is a block diagram showing an embodiment of the invention.

FIG. 1 shows a PLL circuit 8 for a PCM signal embodying the invention.

A cylinder motor 7 drivingly rotates a head 1, which reproduces the PCM signal recorded on a magnetic tape 2. The reproduced PCM signal obtained from the head is fed to a phase comparator 3 included in the PLL circuit 8.

A VCO 6 produces a clock signal for reproducing the PCM signal, feeds the output to a terminal 9 and, as already known, partially feeds back the output to the phase comparator 3. Via a low-pass filter 4 and a limiter circuit 5, a control signal having upper and lower limits is fed to an adder 10.

A band control signal 12 from a channel clock frequency detection circuit 11 is also fed to the adder 10 at the same time. The output is fed to the voltage-controlled oscillator, i.e. VCO, 6. The external signal 12 sets the output frequency band of the VCO 6.

The channel clock frequency detection circuit 11 detects the variation ratio of the frequency f of the PCM signal reproduced by the head to the PCM signal frequency f0 for normal reproduction and produces the band control signal 12 which is in proportion to f/f0.

Figure 6:
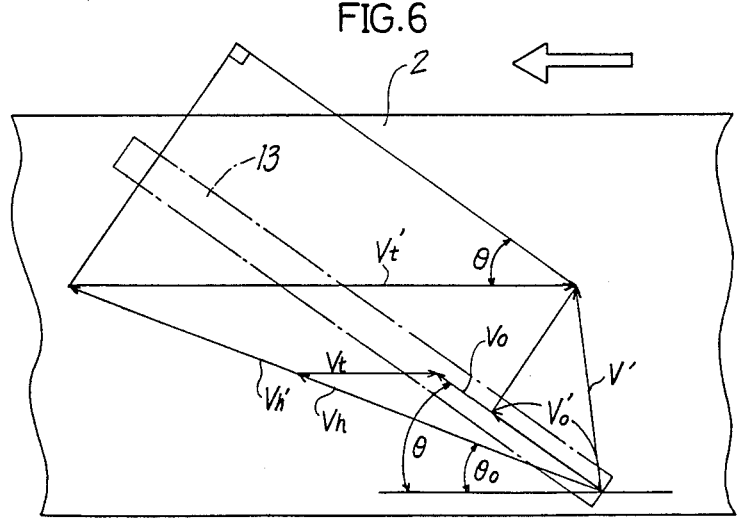
FIG. 6 is a vector diagram showing a variation in the frequency of a PCM signal.

With reference to FIG. 6, $\theta 0$ is the inclination angle of the track when the tape is at rest and is 6°22′ in the case of a digital audio tape recorder of the rotary head type. $\theta$ is the inclination angle of the track during the travel of the tape and is 6°22′59.5″. Vt′ is a component, in the lengthwise direction of the tape, of the speed of the head relative to the tape during high-speed reproduction. Vh′ is the rotational speed of the head during high-speed reproduction. V′ is the actual speed of the head relative to the tape during high-speed reproduction. With reference to the diagram, V′=Vh′+Vt′.

Vt is a component (8.15 mm/sec), in the lengthwise direction of the tape, of the speed of the head relative to the tape during usual reproduction. Vh is the (3.14 m/sec) rotational speed of the head during normal reproduction.

Since a component V0′ of V′ in the direction of the track is proportional to the frequency f of the reproduced PCM signal, $$f \propto V0' = Vh' \cos(\theta - \theta 0) - Vt' \cos \theta.$$

During normal reproduction, $$f0 \propto V0 = Vh \cos(\theta - \theta 0) - Vt \cos \theta,$$

so that $$f/f0 = V0'/V0 \qquad (1)$$
$$= \frac{Vh' \cos(\theta - \theta 0) - Vt' \cos \theta}{Vh \cos(\theta - \theta 0) - Vt \cos \theta}$$

The head speed Vh or Vh′ is obtained by feeding to a head speed detection circuit 26 a signal from a pulse generator PG disposed close to the rotary shaft of the cylinder motor 7. The speed of travel of the tape, Vt or Vt′, is obtained by feeding a rotation signal from a capstan motor or reel motor 24 to a tape speed detection circuit 25.

Figure 4:
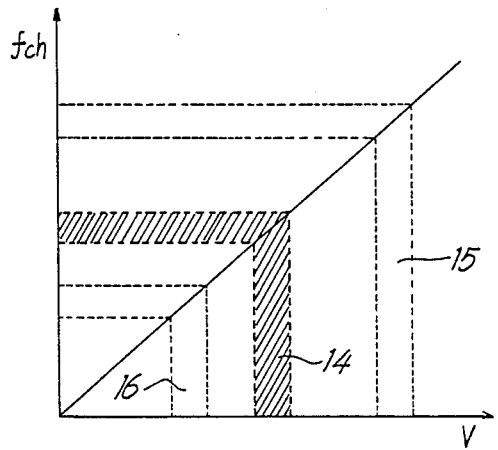
FIG. 4 is a diagram illustrating the operation of a VCO included in the embodiment of FIG. 1.

The channel clock frequency detection circuit 11 feeds to the adder 10 the band control signal 12 in proportion to the ratio f/f0 calculated from equation (1). For normal reproduction, the central frequency of the reproduction signal to be produced by the VCO 6 is adjusted in the central hatched range 14 shown in FIG. 4 and limited by the limiter circuit 5. When the rotational speed of the cylinder remains at the same level as in the normal reproduction mode, the central frequency of the reproduction clock signal shifts to a region 15 for reverse-direction special reproduction, or to a region 16 for forward-direction special reproduction. Thus, the regions 14, 15 and 16 include channel clock frequencies of reproduction clock pulses in conformity with variations in the PCM signal in the respective signal reproduction modes.

Figure 2:
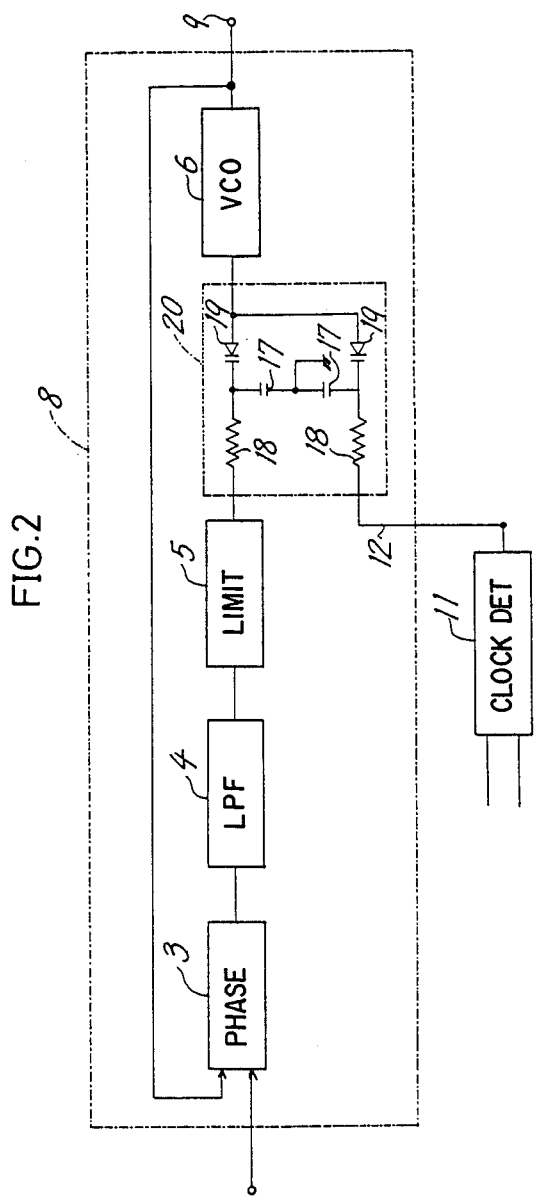
FIGS. 2 and 3 are block diagrams showing other embodiments of the invention.

FIG. 2 shows another embodiment of PLL circuit 8, wherein the adder 10 of the first embodiment is replaced by a variable capacitance circuit 20 comprising capacitors 17, resistors 18 and a variable capacitance diode 19.

Figure 5:
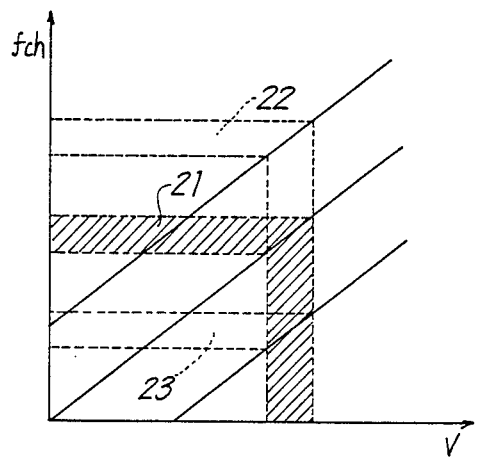
FIG. 5 is a diagram illustrating the operation of a VCO included in the embodiment of FIG. 2.

An output band control signal 12 produced by a channel clock frequency detection circuit 11 using the same arrangement as in the embodiment of FIG. 1 gives a VCO 6 the input-output characteristics 21 or normal reproduction, 23 for forward-direction special reproduction or 22 for reverse-direction special reproduction as seen in FIG. 5.

Figure 3:
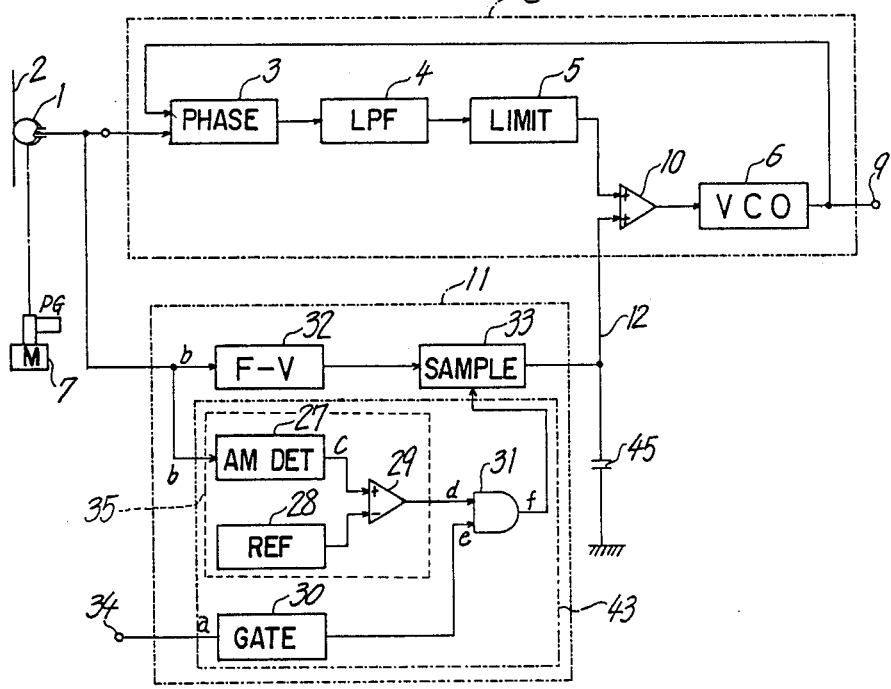

FIG. 3 shows another embodiment of channel clock frequency detection circuit 11, which utilizes a signal of single frequency (½ fch or 1/6 fch, where fch=9.408 MHz) recorded at a specified position in a signal track format on the magnetic tape. For a high-speed search operation, the single-frequency signal in the specified position is extracted to produce a signal in accordance with the channel clock frequency to the reproduced PCM signal.

Figure 7:
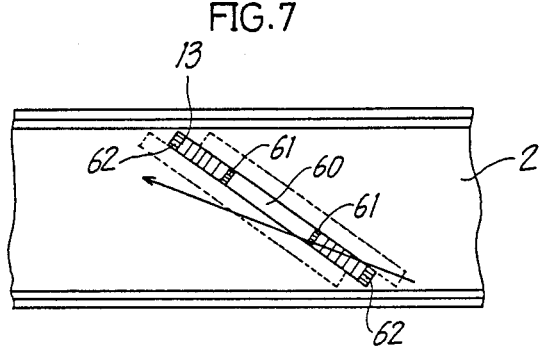
FIG. 7 is a diagram illustrating a signal record area formed in the recording track on a magnetic tape.

With reference to FIG. 7, a track 13 on the magnetic tape has a PCM signal recording area 60, interblock margin areas 61 in front of and behind the area 60, and margin areas 62 at the starting and terminal ends of the track. A signal of single frequency ½ fch or 1/6 fch is recorded in the margin areas 61, 62 to ensure erasure of the previously recorded signal when another signal is superposed on the tape.

According to the present invention, the singlefrequency signal recorded in one of the margin areas 61, 62 is extracted to produce a VCO control signal 12 in accordance with variations in the frequency of the reproduced single-frequency signal.

A timing signal e indicating the passage of the head over the margin area 61 or 62 on the track 13 is produced by a first gate circuit 30 which receives an RF change-over signal a from a terminal 34. The signal e produced is a gate signal indicating the reproduction position of the single-frequency signal on a time axis.

During high-speed reproduction, the head passes across the tracks, so that the RF signal from the head includes a signal reproduced from the tracks with the same azimuth angle with the head and a signal reproduced from the tracks with a reverse azimuth angle to the head, which appear alternately. However, since the signal reproduced from the tracks of reverse azimuth angle is not usable, a second gate circuit 35 removes this signal, extracting the other signal only from the tracks of the same azimuth angle to form a gate signal d.

FIGS. 8a to 8f show the forms of signals at various portions. When an RF signal b is fed to an AM detection circuit 27, this circuit produces an output c having alternating crests and furrows. When the head is on the tracks of the same azimuth angle, the RF signal exhibits an increased amplitude to form crests of the output c, whereas when the head is on the tracks of the reverse azimuth angle, the amplitude of the RF signal diminishes to form furrows of the output c.

Figure 8:
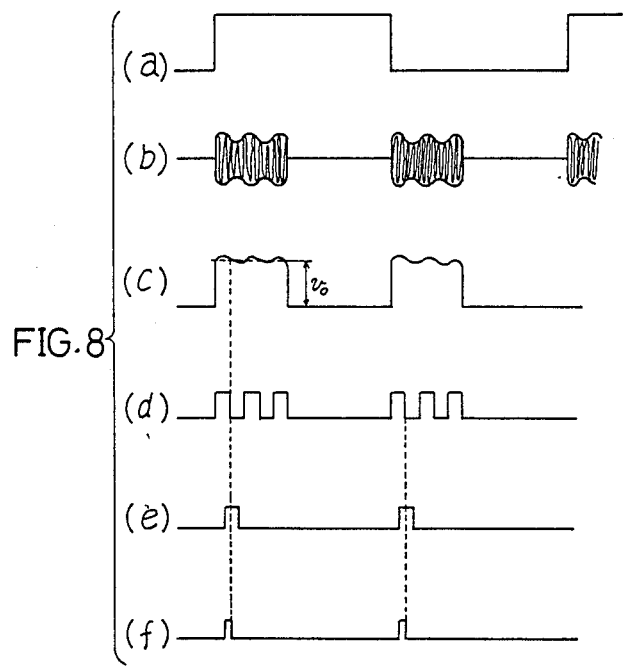
FIGS. 8a to 8f are signal diagrams of a channel clock frequency detection circuit included in the embodiment of FIG. 3.

The output c is compared with an output vo from a suitable reference voltage source 28 in a voltage comparator circuit 29, whereby the signal portion below the potential level vo indicated in a dot-and-dash line in FIG. 8c is eliminated to give an on-track output d. Thus, the portion where the output e from the first gate circuit 30 overlaps the output d from the comparator circuit 29 is an effective region of a single frequency, and a gate signal f representing this position is produced by an AND gate 31.

On the other hand, the RF signal b reproduced by the head 1 is also fed to a frequency/voltage converter circuit (F-V circuit) 32, which produces an output with a potential in proportion to the frequency of the RF signal, and this output is delivered to a sample holding circuit 33. Accordingly, by sampling the single-frequency signal at the positions represented by the gate signal f, a control signal 12 is available which represents the variation in the frequency of the reproduced RF signal, i.e. in the channel clock frequency of the PCM signal. The signal 12 is held in a capacitor 45 and also fed to an adder circuit 10 in the PLL circuit, whereby the frequency of the reproduction clock signal to be produced by the VCC can be varied in conformity with the contemplated PCM signal reproduction mode. The operating range of the VCO 6 can therefore be shifted toward the forward-direction reproduction mode or reverse-direction reproduction mode.

The present invention can be embodied not only for VTRs and R-DATs but also other reproduction systems such as disc reproduction systems, i.e. for reproduction systems for use with recording media having recorded thereon at least a PCM signal and a single-frequency signal on a time division basis.

Furthermore, a plurality of heads can be arranged on the path of travel of the tape for reproducing the PCM signal and the single-frequency signal at different positions at the same time.

Figure 9:
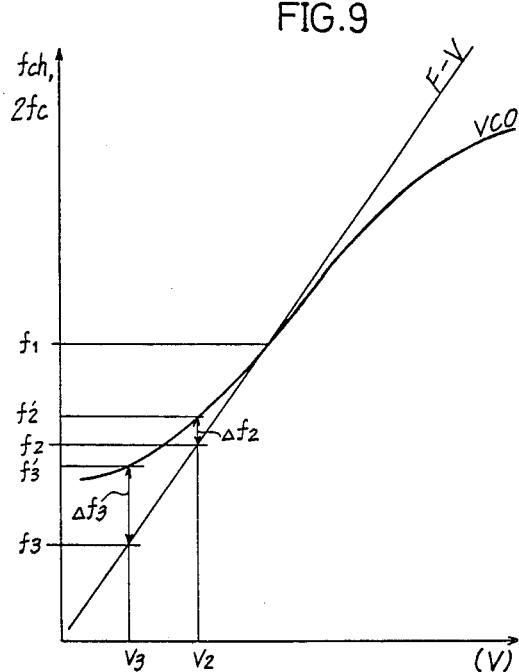
FIG. 9 is a diagram showing the difference between a F-V converter and a VCO in input-output characteristics.

With the embodiment of FIG. 3, variations in the frequency of the single-frequency signal are converted to variations in voltage, which are fed to the VCO 6 to alter the operating range of PLL, so that the F-V converter 32 must be in agreement with the VCO 6 in input-output characteristics. This will be described with reference to FIG. 9. Since the frequency fc of the single-frequency signal to be detected has the relation of $fc = \frac{1}{2} fch$, the input-output characteristics of the F-V converter, which is doubled in input frequency fc and plotted on the ordinate, can be compared with the input-output characteristics of the VCO 6 as seen in FIG. 9. With reference to FIG. 9, the F-V curve and the VCO curve have the same value at an input f1 of the F-V converter. Accordingly, the central frequency of the VCO 6 is in conformity with the PCM signal frequency.

However, the F-V curve and the VCO curve are different in inclination in the vicinity of the right and left ends of FIG. 9, so that when a signal of frequency f2 is applied to the F-V converter 32, the converter produces a voltage of V2, which is fed to the VCO 6, with the result that the reproduction clock pulses delivered from the VCO 6 have a central frequency of f2' involving an error of Δf2. Further when a signal of frequency f3 is fed to the F-V converter, the VCO is set to a central frequency of f3' involving a greater error (Δf3) due to the nonlinear VCO characteristics. Thus, there arises the problem that the desired central frequency is not settable due to varying degrees of inclination and nonlinearity of the VCO characteristics.

Figure 10:
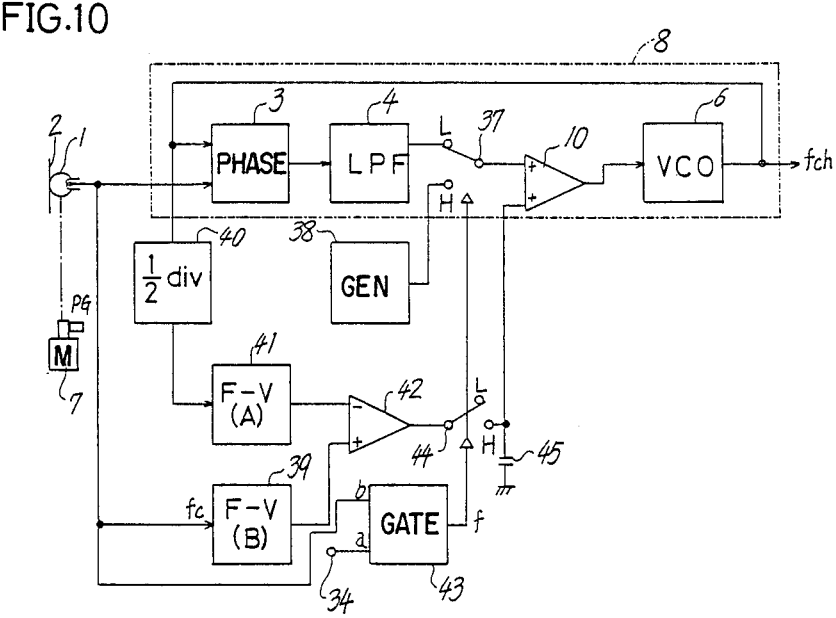
FIGS. 10 and 11 are block diagrams showing other embodiments.

In the case of the embodiment of FIG. 10, the central frequency of the reproduction clock pulses produced by a PLL circuit 8, is compared with the frequency fc of the single-frequency signal detected by the head, and the difference voltage is fed back to the PLL circuit, whereby an accurate central frequency is settable irrespective of the inclination and nonlinearity of the input-output characteristics of the VCO 6 included in the PLL circuit 8 to overcome the above problem. The PLL circuit has an adder 10, to which an electronic switch 37 is connected at one of its input terminals. A capacitor 45 for holding a central frequency control voltage is connected to the other input terminal of the adder. Electronic switches 37 and 44 are controlled by the output signal f of the gate circuit 43 described with reference to the embodiment of FIG. 3, such that when the gate signal f indicating the position of the single-frequency signal is produced during the period of one revolution of the head, the switches 37, 44 are closed at an H side. Consequently, the adder 10 is connected at one input terminal to a constant-voltage generator 38 and at the other input terminal to the holding capacitor 45. During the remaining portion of the period, the electronic switch 37 is closed at the L side, the adder is connected to the low-pass filter 4 and the closed loop of the PLL circuit is formed. The circuit then produces data reproduction clock pulses synchronized with the PCM signal in phase. With the electronic switch 37 closed at the H side, a constant voltage is applied from the generator 38 to the above-mentioned one input terminal of the adder 10 to control the central frequency of the VCO 6.

The single frequency fc to be detected is further fed to F-V converter B 39 and thereby converted to a corresponding voltage. With the present embodiment, the frequency fc to be detected and the data reproduction clock frequency fch have the relation of:

$$fc = \tfrac{1}{2} \cdot fch,$$

so that the output of the VCO 6 is passed through a $\tfrac{1}{2}$ divider 40 and then converted to a voltage by F-V converter A 41 having the same input-output characteristics as the F-V converter B 39. The F-V converter A 41, when made different from the F-V converter B 39 in characteristics, eliminates the need to use the divider 40. The output voltage difference between the F-V converters A, B is amplified by an error amplifier 42. In the control mode wherein the sample holding switch 44 is closed by the gate circuit 43, the error voltage is applied to the VCO control voltage to give a central frequency fch of 2 fc by negative feedback. When the gate circuit 43 opens the switch 44, the error voltage is held in the holding capacitor 45 to fix the central frequency.

Through the operation described above, the central frequency is adjusted to fch, for example, once during one-half revolution of the head in the case of R-DAT, and a PCM signal reproduction clock signal is produced without restriction by the characteristics of the VCO 6.

The mode signal generator 43 can be any circuit in addition to those included in the foregoing embodiments insofar as the single-frequency area is detectable.

Figure 11:
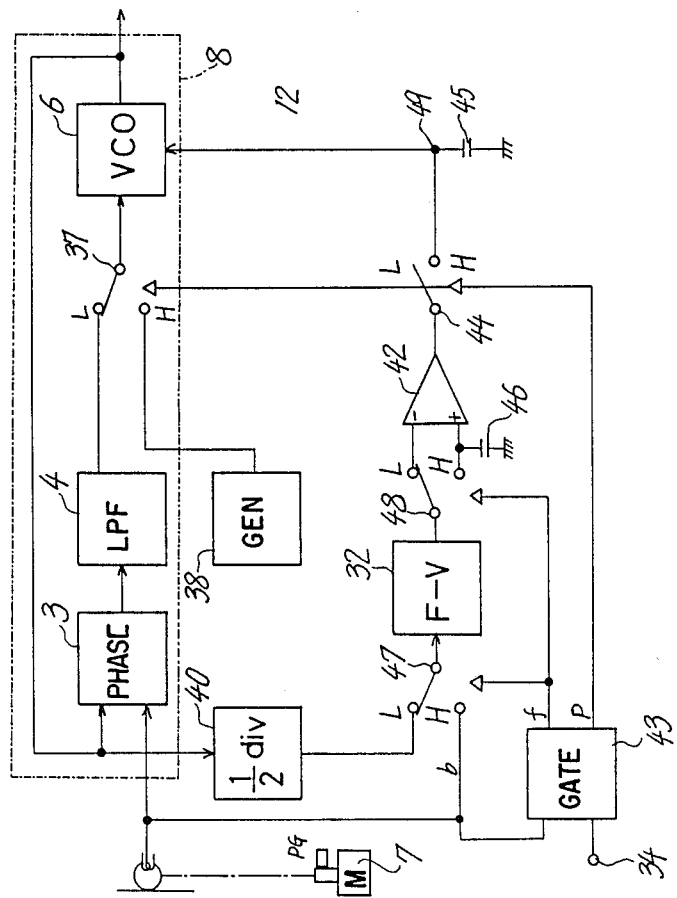
Figure 12:
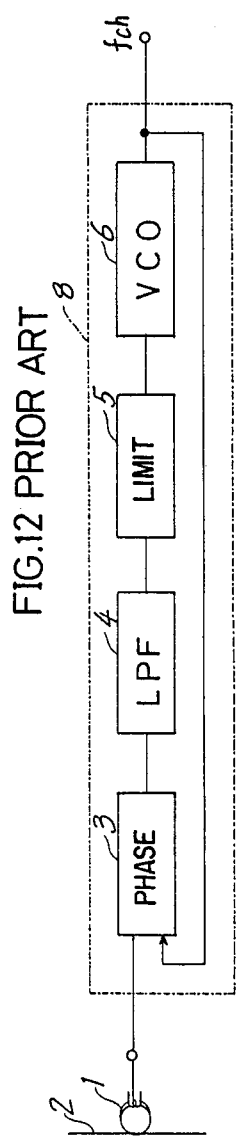
FIG. 12 is a diagram showing a conventional PLL circuit.
Figure 13:
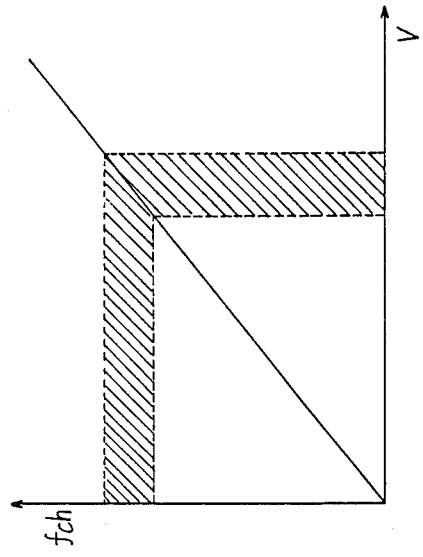
FIG. 13 is a diagram showing the operation of a VCO included in the circuit.

FIG. 11 shows another embodiment of the invention in connection with the embodiment of FIG. 10. This embodiment additionally has a capacitor 46 for holding an F-V converted single-frequency signal from the F-V converter circuit 32, and electronic switches 47, 48 operable by the gate signal f from the gate circuit 43 for changing over the input and output of the F-V converter circuit 32 to the H side.

During the cycle of one revolution of the head, the gate circuit 43 produces a second gate signal pulse p with a slight time delay from the gate signal f corresponding to the single frequency area, and the second gate signal pulse p operates the switches 37 and 44.

During one cycle period of one revolution of the head, the F-V converter circuit 32 has its input and output changed over to the L side or the H side once or a plurality of times by the switches 47, 48. When these switches are closed at the H side, the RF signal b is fed to the F-V converter circuit 32, which produces a voltage according to the single-frequency signal for a capacitor 46 to hold the voltage. During the period other than when the gate signal f is produced, the switches 47, 48 are closed at the L side, and the negatively fed-back reproduction gate signal fch of the PLL circuit, passed through the $\tfrac{1}{2}$ divider 40, is fed to the F-V converter circuit 32, which delivers a voltage corresponding to the input frequency of $\tfrac{1}{2}$ fch. The output voltage is compared with the voltage held in the capacitor 46 by the error amplifier 42, which in turn produces a control voltage 12. When the electronic switches 37, 44 are closed at the H side by the second gate signal pulse p from the gate circuit 43, the control voltage 12 controls the VCO 6 and is also held in the capacitor 45.

In the case of the present embodiment, the reproduction clock signal from the PLL circuit 8 and the RF signal from the head are alternately fed to the F-V converter 32. This permits the use of the single F-V converter commonly for the two signals and obviates the need to consider the difference in characteristics between the F-V converters A 41 and B 39 of the embodiment of FIG. 10. Further the variable range of the VCO 6 is directly controlled instead of adding the error voltage output 49 to the VCO input control voltage. This eliminates the need to give a large variable range to the VCO, rendering the VCO easy to design.

The construction of the circuit of the invention is not limited to the foregoing embodiments but can of course be modified variously within the technical scope defined in the appended claims.

What is claimed is:

1. A clock providing circuit wherein a PCM signal recorded on a recording medium is reproduced by a head, said clock providing circuit comprising:
    a voltage-controlled oscillator producing an output PCM signal reproduction clock;
    a phase comparator comparing a reproduced PCM signal from the head with the output from the voltage-controlled oscillator, a resulting output from the phase comparator being fed back to the voltage-controlled oscillator to control frequency of the reproduction clock according to variations in frequency of the reproduced PCM signal;
    a recording medium speed detecting circuit;
    a head speed detecting circuit;
    a channel clock frequency detection circuit being connected to said recording medium speed detecting circuit and said head speed detecting circuit to receive input signals representing recording medium speed and a head speed and to reproduce a resulting output signal formed by the following expression, $$\frac{Vh' \cos(\theta - \theta_o) - Vt' \cos\theta}{Vh \cos(\theta - \theta_o) - Vt \cos\theta}$$

wherein $\theta_o$ is a head trace angle when the recording medium is at rest, $\theta$ is a track angle on the recording medium during travel, Vt is the recording medium during normal reproduction, Vt' is the recording medium speed during special reproduction, Vh is a head rotation speed during normal reproduction, and Vh' is a head rotation speed during special reproduction, the voltage-controlled oscillator receiving a band control signal related approximately with the output signal from the channel clock frequency detection circuit, and shifting an output frequency band of the voltage-controlled oscillator and therein controlling an output range of the voltage-controlled oscillator so that the output range includes a channel clock frequency in the reproduced PCM signal.

2. A clock providing circuit wherein a PCM signal recorded on a recording medium is reproduced by a head, said clock providing circuit comprising:
    a voltage-controlled oscillator providing an output PCM signal reproduction clock;
    a phase comparator comparing a reproduced PCM signal from the head with the output from the voltage-controlled oscillator, a resulting output from the phase comparator being fed back to the voltage-controlled oscillator to control frequency of the reproduction clock according to variations in frequency of the reproduced PCM signal;
    a frequency/voltage converter circuit for forming a signal of voltage corresponding to frequency of an RF signal from the head;
    a gate for forming a gate signal corresponding to a recorded position of a single-frequency signal included in a track format recorded on a signal recording track of the recording medium; and
    a sample holding circuit with timing specified by the gate and indicated by the output signal from the frequency/voltage converter circuit, the sample holding circuit extracting a single-frequency signal from the voltage output signal converted from the RF signal, feeding the signal portion to the voltage-controlled oscillator to shift the output frequency band of the voltage-controlled oscillator and to therein control an output range of the voltage-controller oscillator so that the output range includes a channel clock frequency in the reproduced PCM signal.

3. A clock providing circuit wherein a PCM signal recorded on a recording medium is reproduced by a head, said clock providing circuit comprising:
    a voltage controlled oscillator producing an output PCM signal reproducing clock;
    a phase comparator comparing a reproduced PCM signal from the head with the output from the voltage-controlled oscillator, a resulting output from the phase comparator being fed back to the voltage-controlled oscillator to control frequency of the reproduction clock according to variations in frequency of the reproduced PCM signal; and
    a channel clock frequency detection circuit comparing the frequency of the clock signal from the voltage-controlled oscillator with a frequency of an RF signal from the head upon conversion of each frequency of a voltage output, a resulting difference signal as to a single-frequency signal portion derived from the RF signal being fed to the voltage-controlled oscillator as a band control signal to shift an output frequency band of the voltage-controlled oscillator and to control an output range of the voltage-controlled oscillator so that the output range includes a channel clock frequency in the reproduced PCM signal.

4. A circuit as defined in claim 3 wherein the detection circuit comprises a first frequency/voltage converter for converting the signal from the voltage-controlled oscillator to a voltage output, a second frequency/voltage converter for converting the RF signal from the head to a voltage output, an error amplifier for producing a signal corresponding to the difference between the outputs from the two converters, a gate for producing a gate signal corresponding to the recorded position of a single-frequency signal included in a track format recorded on the signal recording track of the medium, and an electronic switch controllable by the gate.

5. A circuit as defined in claim 3 wherein the detection circuit comprises a frequency/voltage converter for converting the RF signal from the head to a voltage output, a capacitor for holding the voltage output of the converter, an error amplifier, a gate for producing a gate signal corresponding to the recorded position of a single-frequency signal included in a track format recorded on the signal recording track of the medium, and electronic switches controllable by the gate for changing over the input and output of the converter and the output of the error amplifier, and the single-frequency signal and the reproduction clock frequency of the voltage-controlled oscillator are converted to the respective voltage outputs by the frequency/voltage converter upon operating the electronic switches.

* * * * *